United States Patent
Liu et al.

(10) Patent No.: US 12,379,913 B2
(45) Date of Patent: Aug. 5, 2025

(54) DEPLOYMENT OF CONTAINER IMAGES WITH SEPARATE ADD-ONS

(71) Applicant: INTERNATIONAL BUSINESS MACHINES CORPORATION, Armonk, NY (US)

(72) Inventors: Rui Liu, Beijing (CN); Ying Mo, Beijing (CN); Yue Chen, Beijing (CN); Ya Xiao, Beijing (CN); Hu Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 18/191,454

(22) Filed: Mar. 28, 2023

(65) Prior Publication Data

US 2024/0329958 A1    Oct. 3, 2024

(51) Int. Cl.
*G06F 8/65* (2018.01)
*G06F 8/61* (2018.01)
*G06F 9/445* (2018.01)

(52) U.S. Cl.
CPC .............. *G06F 8/63* (2013.01); *G06F 8/65* (2013.01); *G06F 9/44526* (2013.01)

(58) Field of Classification Search
None
See application file for complete search history.

(56) References Cited

U.S. PATENT DOCUMENTS

| | | | |
|---|---|---|---|
| 10,073,974 | B2 | 9/2018 | Hwang et al. |
| 10,908,887 | B2 * | 2/2021 | Bhat .................. G06F 8/63 |
| 11,055,428 | B1 * | 7/2021 | Clerget ............... G06F 21/6209 |
| 11,392,422 | B1 * | 7/2022 | Filiz .................... G06F 9/45558 |
| 11,422,844 | B1 * | 8/2022 | Filiz .................... G06F 9/45558 |
| 2007/0011303 | A1 * | 1/2007 | Hatakeyama ........... H04L 63/08 709/224 |
| 2011/0119484 | A1 * | 5/2011 | Jallad ..................... H04L 67/02 713/168 |
| 2017/0249127 | A1 * | 8/2017 | Parees ....................... G06F 8/30 |
| 2019/0114081 | A1 | 4/2019 | Engel et al. |
| 2019/0235897 | A1 * | 8/2019 | Goel .................. G06F 9/45545 |

(Continued)

FOREIGN PATENT DOCUMENTS

WO    WO-2019111907 A1 *  6/2019

OTHER PUBLICATIONS

Collet, Y., "Zstandard Compression and the Application/zstd Media Type," Oct. 2018, pp. 1-54.

(Continued)

*Primary Examiner* — Philip Wang
(74) *Attorney, Agent, or Firm* — Aaron Pontikos, Esq.; Blanche E. Schiller, Esq.; Heslin Rothenberg Farley & Mesiti P.C.

(57) ABSTRACT

A container image is deployed, at runtime, on a node within a computing environment. The deploying includes downloading, at runtime, container image content from multiple sites. The downloading includes obtaining a core image of the container image from one or more image registries and updating a local image store with the core image, and obtaining one or more add-ons of the container image from one or more add-on registries and updating a local add-on store with the one or more add-ons. The deployed container image is executed on the node.

20 Claims, 6 Drawing Sheets

(56) References Cited

U.S. PATENT DOCUMENTS

| | | | | |
|---|---|---|---|---|
| 2019/0324786 | A1* | 10/2019 | Ranjan | G06F 9/45558 |
| 2020/0364258 | A1 | 11/2020 | Scrivano | |
| 2021/0103450 | A1* | 4/2021 | Prasad | G06F 9/45558 |
| 2021/0141655 | A1* | 5/2021 | Gamage | G06F 9/45545 |
| 2022/0019455 | A1* | 1/2022 | Cao | G06F 21/6218 |
| 2022/0092192 | A1* | 3/2022 | Wolfson | G06F 9/45545 |
| 2022/0271975 | A1* | 8/2022 | Chen | G06F 9/45558 |
| 2022/0335139 | A1* | 10/2022 | Yang | G06F 9/45558 |
| 2024/0078344 | A1* | 3/2024 | Hsu | H04L 9/0643 |
| 2024/0103823 | A1* | 3/2024 | Douglas | G06F 8/36 |
| 2024/0143412 | A1* | 5/2024 | Ye | G06F 9/45558 |
| 2024/0248738 | A1* | 7/2024 | Singh | G06F 8/63 |

OTHER PUBLICATIONS

Deutsch, P., "GZIP File Format Specification Version 4.3," Aladdin Enterprises, May 1996, pp. 1-12.

Github, "Containerd/containerd," https://github.com/containerd/containerd/blob/main/pkg/cri/server/, downloaded from internet Feb. 23, 2023, 17 pages.

Github, "cri-o/cri-o," https:/github.com/cri-o/cri-o/blob/main/server/image_pull.go/, downloaded from internet Feb. 23, 2023, 8 pages.

Github, "Image Layer Filesystem Changeset," https://github.com/opencontainers/image-spec/blob/main/layer.md/, downloaded from internet Feb. 23, 2023, 4 pages.

Github, "Kubernetes/cri-api," https://github.com/kubernetes/cri-api/blob/c75ef5b/pkg/apis/runtime/v1/, downloaded from internet Feb. 23, 2023, 45 pages.

Github, "Open Container Initiative," https://github.com/opencontainers/image-spec/blob/main/spec.md/, downloaded from internet Feb. 23, 2023, 4 pages.

GRPC, "A High Performance, Open Source Universal RPC Framework," https://grpc.io/, downloaded from internet Feb. 23, 2023, 3 pages.

Kubernetes, "Container Runtime Interface (CRI)", https://kubernetes.io/docs/concepts/architecture/cri/, downloaded from internet Feb. 23, 2023, 1 page.

Kubernetes, "Container Runtimes", https://kubernetes.io/docs/setn/production-environment/container-runtimes/, downloaded from internet Feb. 23, 2023, 6 pages.

Kubernetes, "Kubelet", https://kubernetes.io/docs/reference/command-line-tools/reference/kubelet/, downloaded from internet Feb. 24, 2023, 16 pages.

Wikipedia, "tar (computing)," https://en.wikipedia.org/wiki/Tat-(computing), downloaded from internet Feb. 23, 2023, pp. 1-11.

* cited by examiner

DEPLOYMENT OF CONTAINER IMAGES WITH SEPARATE ADD-ONS

BACKGROUND

One or more aspects relate, in general, to facilitating processing within a computing environment, and in particular, to the deployment of container images.

A container image is a software package that includes the software to be used to run an application, including, for example, code, application and system libraries and runtime default settings. The size of container images continues to grow larger, and some are several gigabytes in size. A change, including a slight change, in configuration requires a different image, and at times, there are requirements to dynamically change the components in the image.

Due to the increasing size of images, consumption of storage and network resources of container systems has increased, as well as the cost of an image registry. Further, deployment processes used to deploy container images and the development of container-related processes have slowed down.

SUMMARY

Shortcomings of the prior art are overcome, and additional advantages are provided through the provision of a computer-implemented method of facilitating processing within a computing environment. The computer-implemented method includes deploying, at runtime, a container image on a node within the computing environment. The deploying includes downloading, at runtime, container image content from multiple sites. The downloading includes obtaining a core image of the container image from one or more image registries and updating a local image store with the core image, and obtaining one or more add-ons of the container image from one or more add-on registries and updating a local add-on store with the one or more add-ons. The container image is executed on the node.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
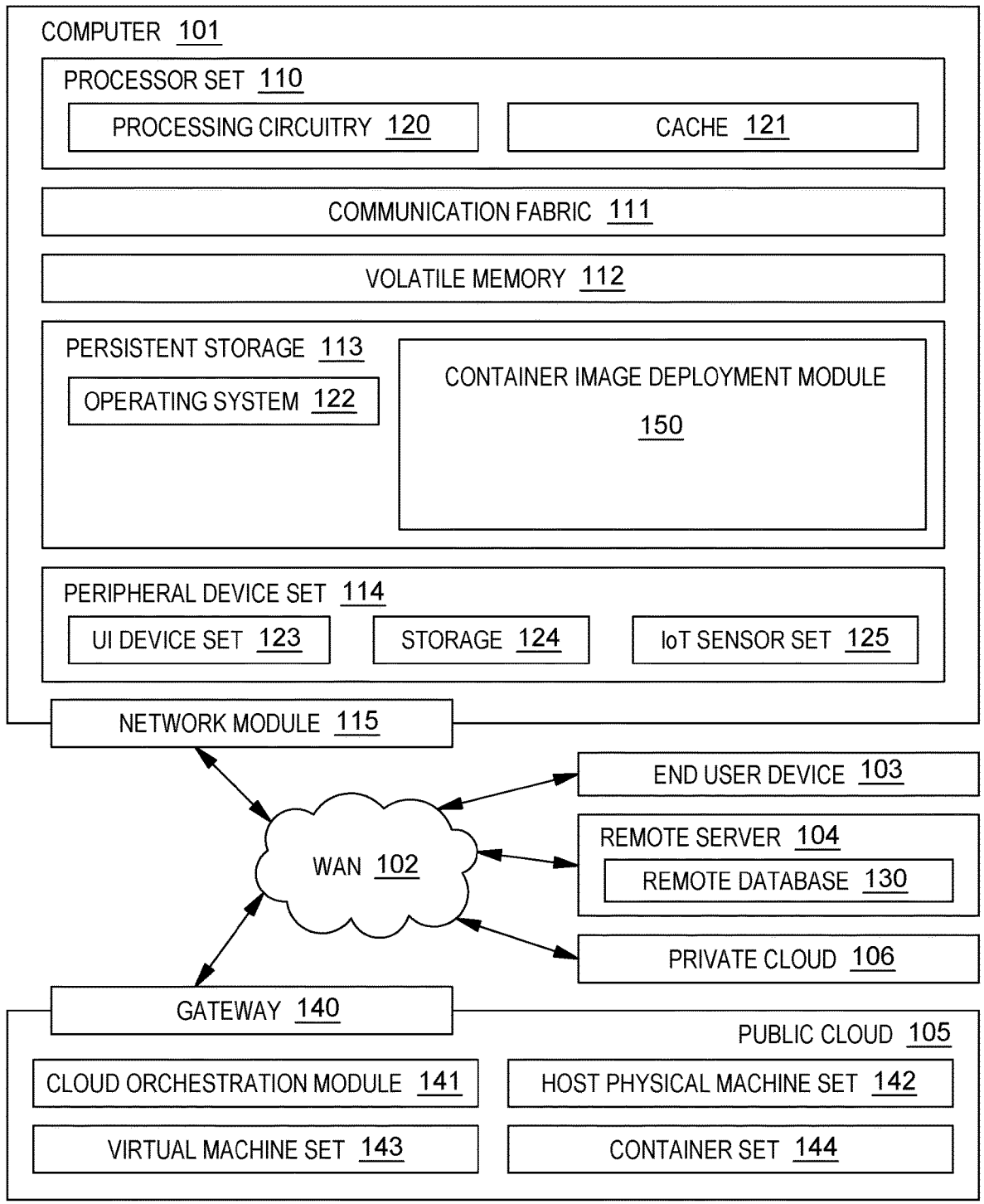
FIG. 1 depicts one example of a computing environment to incorporate and use one or more aspects of the present invention.

In accordance with one or more aspects, a capability is provided to facilitate processing within a computing environment. In one or more aspects, the capability includes improving deployment of container images within the computing environment. For example, the capability includes providing a deployment process that reduces image size and costs at runtime. In one or more aspects, the size of a container image is reduced and stabilized, and dynamically changing application components are provided as extensions or add-ons to the image.

In one or more aspects, a container image is separated into multiple parts including, for instance, a core image and one or more add-ons. The core image is, for instance, the data packaging that follows an image format specification loaded from one or more image registries. One example of an image format specification is an Open Container Initiative® (OCI) image format specification, which is an open governance structure for creating open industry standards around container formats and runtimes. Open Container Initiative is a registered trademark of The Linux Foundation, San Francisco, CA. Other image format specifications may be used. The image add-ons are, e.g., components dynamically loaded from one or more add-on registries, which are, e.g., separate registries from the image registries. In one example, the add-ons support multiple media types, such as gzip, Zstandard (zstd), tar, etc. Other media types are possible.

In one or more aspects, container image content is downloaded from multiple sites at runtime in order to avoid placing redundant data in the image. In one or more aspects, add-ons are developed for one or more images of one or more types. In one or more aspects, the dynamic content applied to the image is well scanned, and protected by, for example, a setting of read-only. Different users are used for installation and runtime, in one example.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) to, e.g., deploy container images and/or perform one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as container image deployment code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

As indicated, in one example, computing environment 100 supports containers. The containers may be provided in a cloud, such as a public cloud (e.g., public cloud 105), a private cloud (e.g., private cloud 106), a hybrid cloud and/or on-premises (e.g., computer 101). In one example, containers are managed by one or more of various management platforms. One example of such a platform is Kubernetes®, which is an open-source, extensible, portable container management platform. Kubernetes is a registered trademark of The Linux Foundation, San Francisco, CA. Other platforms may also be used. In Kubernetes, for example, a container has its own central processing unit share, filesystem, process space, memory and more. Further, containers may share the operating system (OS) among applications due to their relaxed isolation properties; containers are decoupled from the underlying infrastructure; containers are portable across operating system distributions and clouds; and each container is repeatable. Containers are intended to be stateless and immutable-code of a running container is not to be changed; instead, a new container image is built to include the change. Further details regarding containers are described with reference to FIG. 2.

Figure 2:
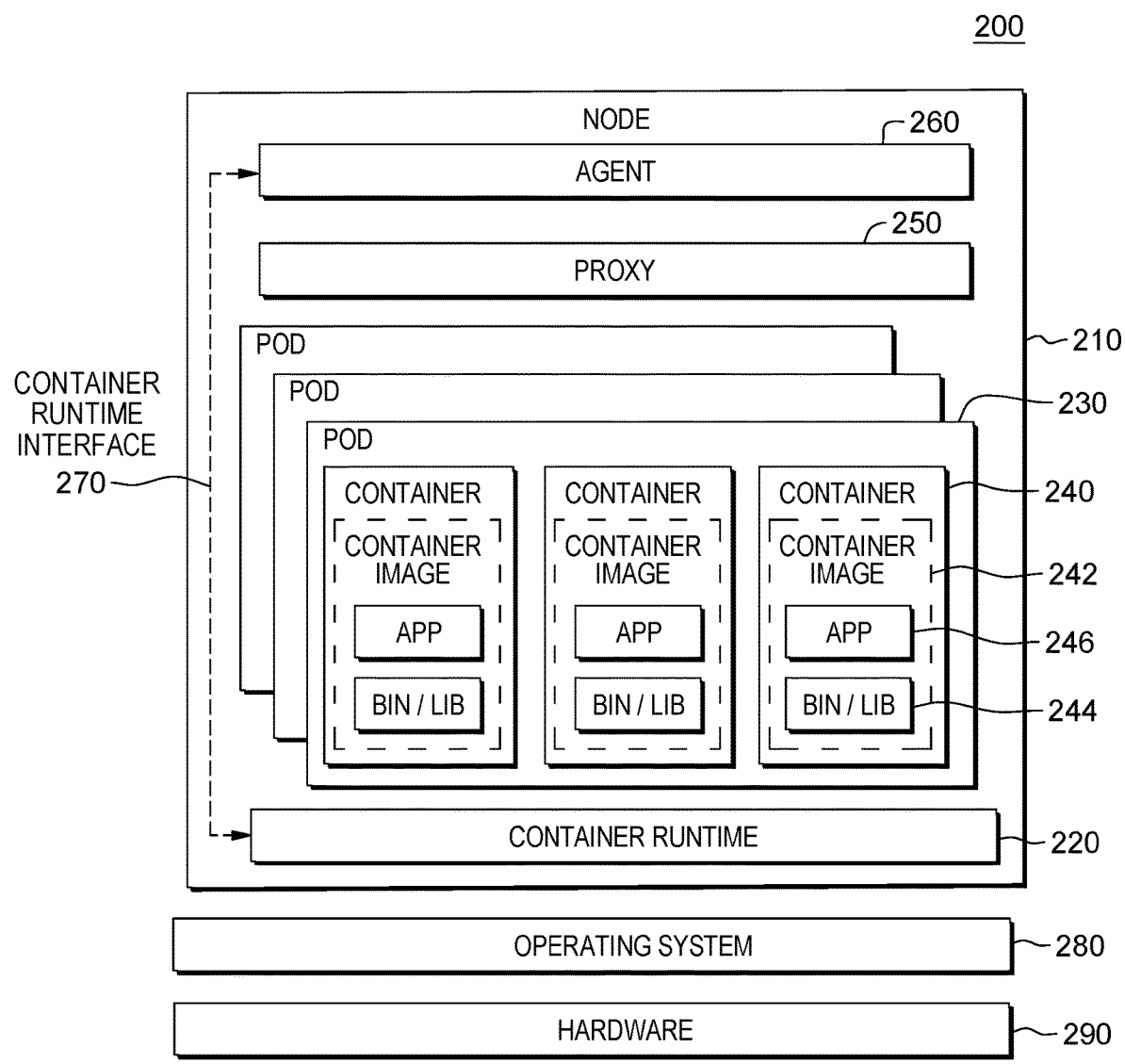
FIG. 2 depicts one example of a node, in accordance with one or more aspects of the present invention.

In one example, referring to FIG. 2, a computing environment 200 includes one or more nodes 210, an operating system 280 shared by the one or more nodes, and underlying hardware 290, such as processing units, etc. used by the one or more nodes. The nodes may be virtual or physical machines, and they may be on-premise (e.g., in computer 101 and/or other computing devices) and/or in a cloud environment (e.g., public cloud 105, private cloud 106, a hybrid cloud environment and/or other cloud environment). In one example, computing environment 200 employs a platform, such as Kubernetes and/or another platform, to manage the containers. Kubernetes is a platform for running and managing containers from a plurality of container runtimes, including, but not limited to, Docker®, Containerd®, Container Runtime Interface-Open Container Initiative (CRI-O), etc. Although examples of platforms and runtimes are provided, additional, fewer and/or other platforms and/or runtimes may be used. Docker is a registered trademark of Docker, Inc., San Francisco, CA; and containerd is a registered trademark of The Linux Foundation, San Francisco, CA.

In one example, a node 210 includes a container runtime 220, such as, for instance, Docker, containerd, Container Runtime Interface-Open Container Initiative (CRI-O), etc.; one or more pods 230; a proxy 250; and an agent 260. One example of proxy 250 is a kube-proxy, which is a network proxy that runs on each node in a cluster, implementing part of the Kubernetes Service concept. A kube-proxy maintains network rules on the nodes, and these network rules allow network communication to the pods from network sessions inside or outside of the cluster. One example of agent 260 is a kubelet that runs on each node. It can register the node, using one or more of a hostname, flag or other, with an application programming interface (api) server that validates and configures data for objects (e.g., pods). In other examples in which the platform is other than Kubernetes, the proxy and agent may be for that platform. Many examples are possible.

In one example, a container runtime interface 270 is provided, which is a plugin interface that enables agent 260 (e.g., the kubelet) to use a wide variety of container runtimes (e.g., container runtime 220) without having to recompile the cluster components.

In one example, a pod 230 includes one or more containers 240, and a container 240 includes, for instance, a container image 242 having one or more applications 246 with one or more libraries 244, and/or one or more binary and/or text resources. A container image is deployed on the node (e.g., node 210), as described herein.

In accordance with one or more aspects, deployment of a container image (e.g., container image 242) is facilitated, reducing and stabilizing the size of the image. In one or more aspects, a container image deployment module (e.g., container image deployment module 150) is used to deploy container images, at runtime. A container image deployment module (e.g., container image deployment module 150) includes code or instructions used to perform container image deployment, in accordance with one or more aspects of the present invention. A container image deployment module (e.g., container image deployment module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computers, servers, processors, nodes, processing circuitry and/or other computing devices may be used to execute one or more of the sub-modules and/or portions thereof. Many examples are possible.

Figure 3:
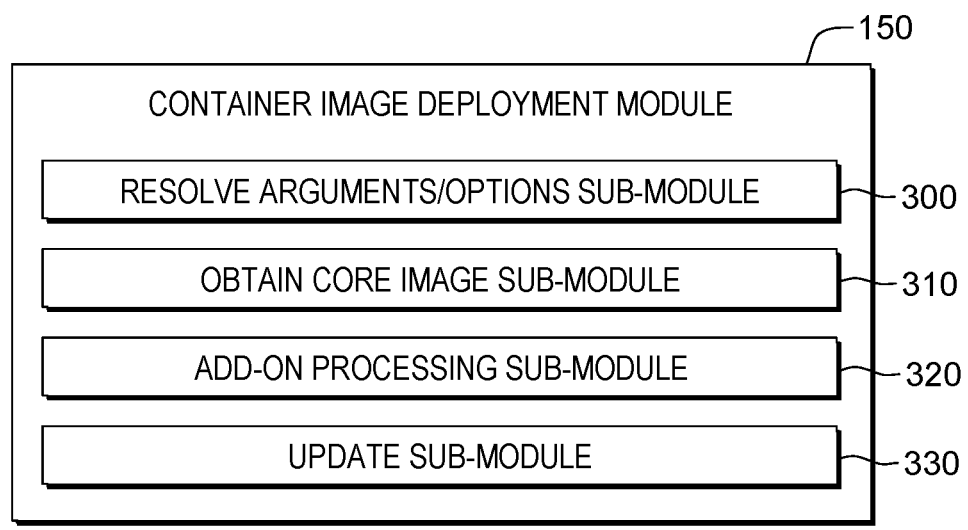
FIG. 3 depicts one example of sub-modules of a container image deployment module of FIG. 1, in accordance with one or more aspects of the present invention.

One example of container image deployment module 150 is described with reference to FIG. 3. In one example, container image deployment module 150 includes a resolve arguments/options sub-module 300 to resolve arguments/options of a container image being deployed; an obtain core image sub-module 310 to obtain (e.g., pull, download, retrieve, be provided, etc.) a core image of a container image from a registry, such as an image registry; an add-on processing sub-module 320 to check if there are one or more add-ons and to obtain (e.g., pull, download, retrieve, be provided, etc.) one or more add-ons, if they exist, for the container image; and an update sub-module 330 to update one or more local stores with the obtained core image and the one or more add-ons. Additional, fewer and/or other sub-modules may be provided and/or used in one or more aspects of the present invention.

The sub-modules are used, in accordance with one or more aspects of the present invention, to deploy container images, as further described with reference to FIG. 4. In one example, a container image deployment process (e.g., a container image deployment process 400) is implemented using one or more of the sub-modules (e.g., sub-modules 300-330) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computers, servers, processors, nodes, processing circuitry and/or computing devices are provided, additional, fewer and/or other computers, servers, processors, nodes, processing circuitry and/or computing devices may be used for the container image deployment process and/or other processing. Various options are possible.

Figure 4:
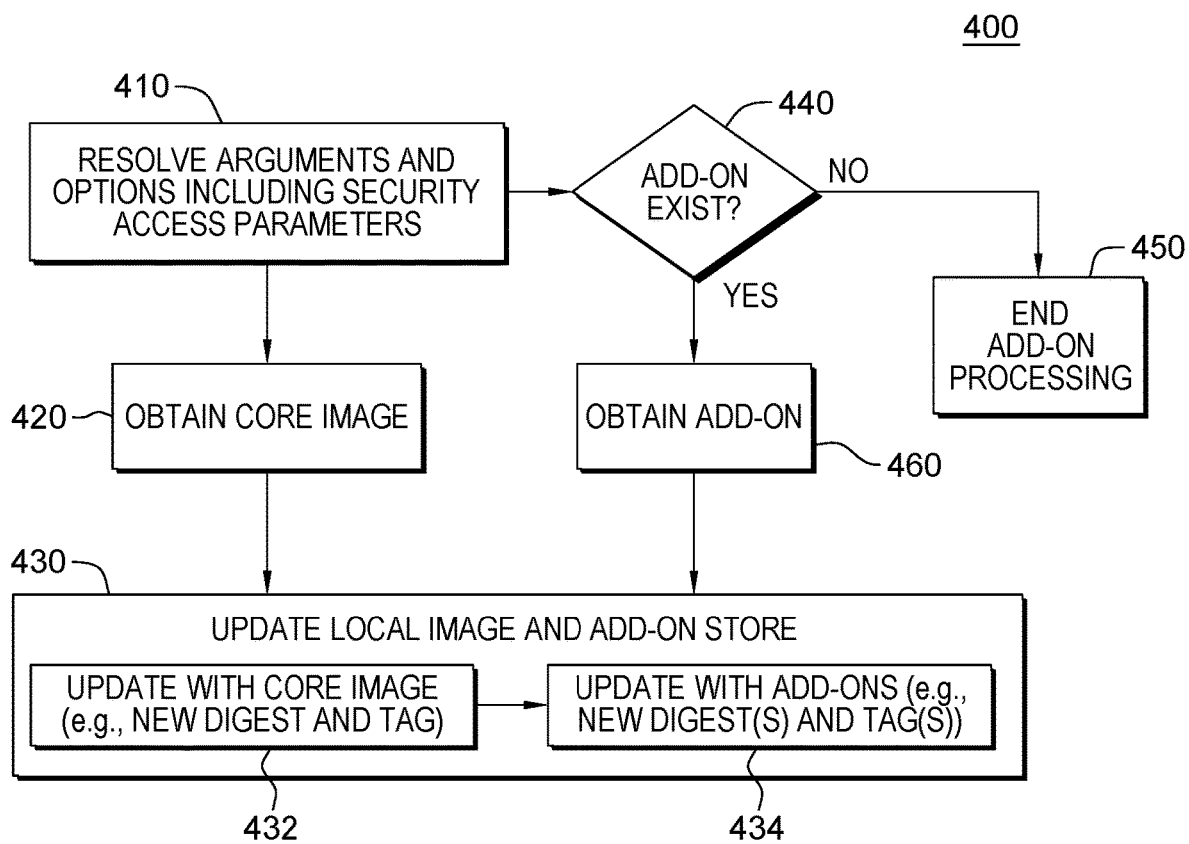
FIG. 4 depicts one example of a container image deployment process, in accordance with one or more aspects of the present invention.

Referring to FIG. 4, in one example, container image deployment process 400 (also referred to herein as process 400) is performed by an agent (e.g., agent 260—e.g., a kubelet) executing on a node (e.g., node 210) in which the container image is to be deployed. Other variations are possible.

In one example, process 400 resolves 410 arguments and/or options including, for instance, security access parameters for the container image. As an example, the configurations of an image to be deployed include, e.g., the command line arguments, environment variables, ports, volume mounting points, image pull policy, restart policy, and/or resource limits, etc., as well as some security access parameters (e.g., example image pull secrets and various security context, for example, if using privileged user, if allowing privileged escalation, is the root file system read-only, etc.).

Figure 5:
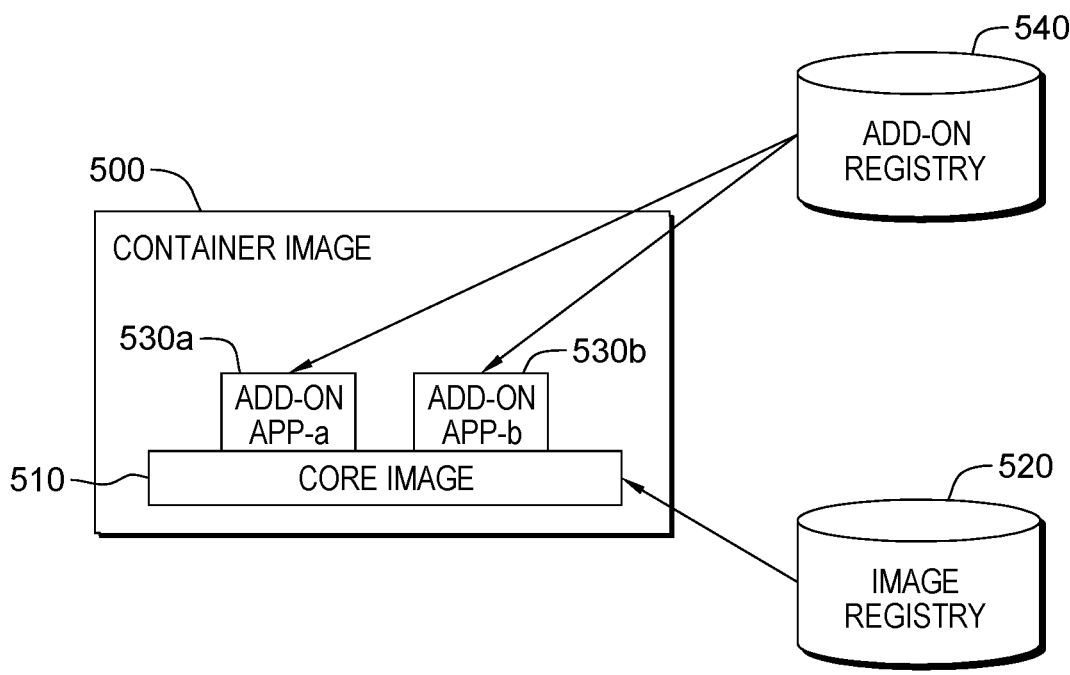
FIG. 5 depicts one example of a container image separated into a core image and multiple add-ons, in accordance with one or more aspects of the present invention.

Further, in one example, process 400 obtains (e.g., pulls, downloads, retrieves, is provided, etc.) 420 a core image from a registry. For instance, in accordance with one or more aspects of the present invention, a container image is divided into, for example, a core image and one or more add-ons, assuming there are add-ons. As shown in FIG. 5, a container image 500 includes a core image 510, which is pulled from one or more image registries 520. The core image is, for instance, the image based on the current container image specification. The dynamic and optional contents are removed, in accordance with an aspect of the present invention, and provided as add-ons, which may be selected, as described herein.

Returning to FIG. 4, process 400 updates 430 a local image store. For instance, it updates 432 the local image store by adding the core image (e.g., a new digest and/or tag for the core image) to the local image store.

Further, in one example, process 400 determines 440 whether there is at least one add-on for the container image. For instance, a user specifies, if desired, add-on addresses with arguments in their pod manifest (e.g., Kubernetes pod manifest) and an additional parameter in the image spec message indicates if there are add-ons.

Should there be no add-ons, add-on processing is complete 450. However, should there be at least one add-on, then process 400 obtains (e.g., pulls, downloads, retrieves, is provided, etc.) 460 an add-on from a corresponding registry. For instance, as shown in FIG. 5, an add-on, such as App-a 530*a* and/or App-b 530*b*, is pulled from one or more add-on registries 540. In one example, the one or more add-on registries 540 are separate from the one or more image registries 520.

Returning to FIG. 4, process 400 updates 430 a local add-on store. For instance, process 400 updates 434 the local add-on store by adding the add-on (e.g., a new digest and/or tag for the add-on) to the local add-on store. The add-on processing, including for instance, checking whether an add-on exists and obtaining the add-on, should one exist, and the updating the local add-on store, are performed for each add-on to be deployed for the container image.

Figure 6:
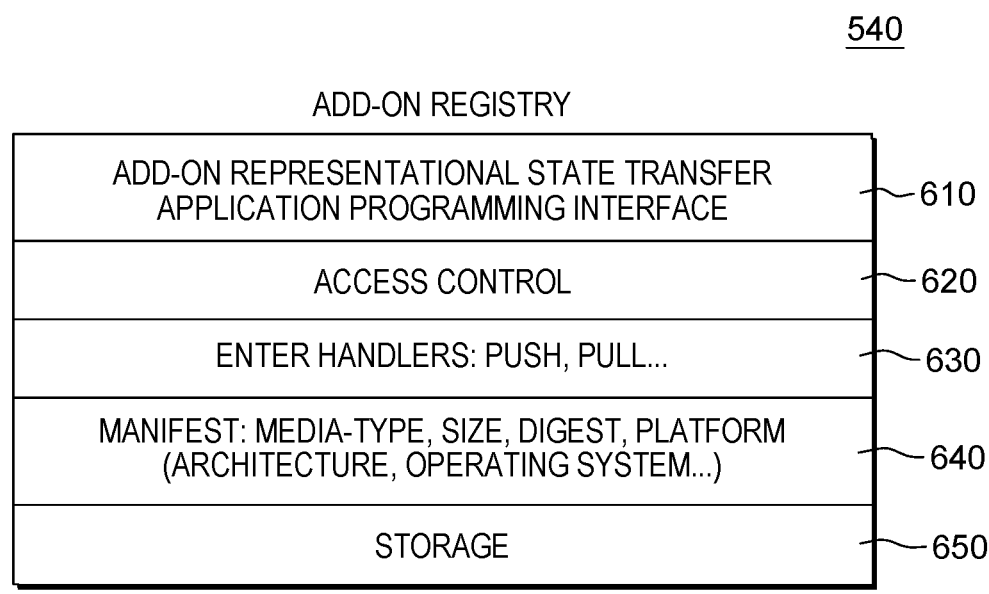
FIG. 6 depicts one example of an add-on registry, in accordance with one or more aspects of the present invention.

Further details regarding one example of an add-on registry, such as add-on registry 540, are described with reference to FIG. 6. In one example, an add-on registry, such as add-on registry 540, includes, for instance, an add-on representational state transfer (REST) application programming interface (API) 610 for one or more add-ons; access control 620 for the one or more add-ons; enter handlers 630, such as, e.g., push, pull, etc. for the one or more add-ons; a manifest 640 including, for example, media-type, size, digest, platform (e.g., architecture, operating system, etc.) and/or custom labels and/or tags used for users to filter a selected or best add-on with an add-on address and one or more arguments for the one or more add-ons; and storage 650 of the one or more add-ons. A registry may include additional, fewer and/or other information/components.

Figure 7:
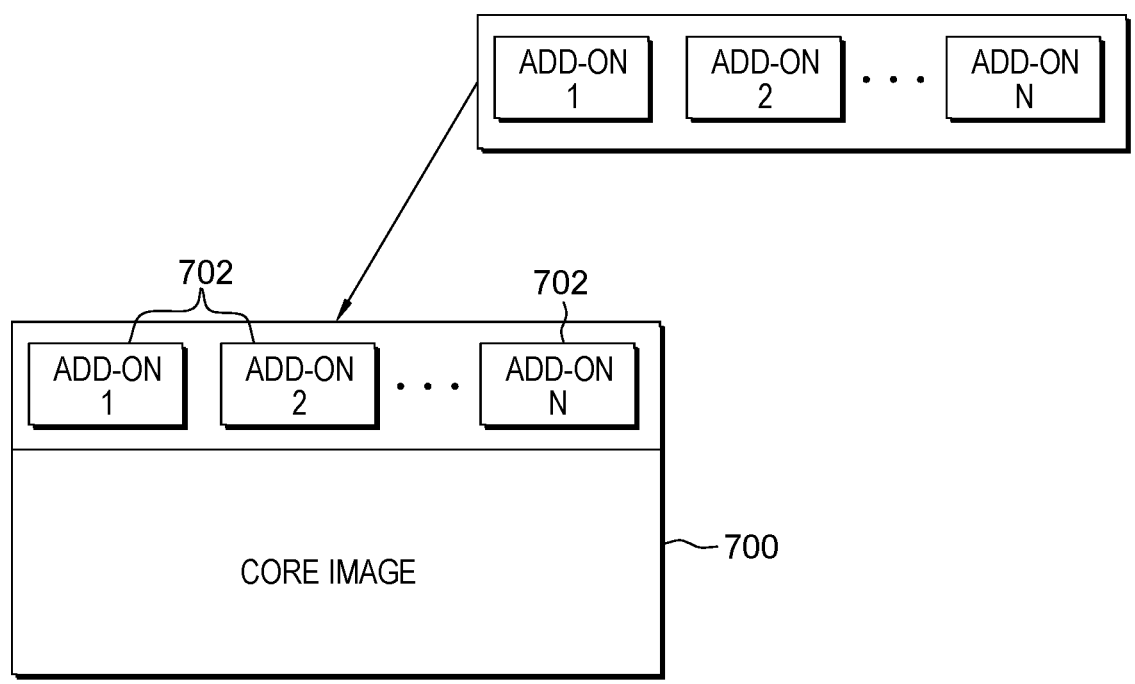
FIG. 7 depicts one example of separately deploying a core image and multiple add-ons at runtime, in accordance with one or more aspects of the present invention.

Thus, in accordance with one or more aspects of the present invention, as depicted in FIG. 7, in one example, deployment of a container image includes deploying a core image 700 (e.g., on a node) and separately deploying one or more add-ons 702 (e.g., on a node). The core image (e.g., core image 700) and the add-ons are distributed separately and then composed at runtime, as depicted in FIG. 7. The container image is composed dynamically, which is more efficient than traditional processes (which focus on optimizing container image size statically by building separate images for different usages), especially when there is a common base foundation with one or many (e.g., a large variety of) add-ons per selection at runtime.

In one example, the container image is executed at runtime. It uses a container runtime (e.g., container runtime 220), which is, e.g., software responsible for running the containers, and it logically runs in a pod (e.g., pod 230). The pod includes a specification that specifies how to run the containers. Thus, in accordance with an aspect of the present invention, a pod specification is revised to include an optional add-on field, which is in addition to the image field. For instance, one example of a pod specification includes:

```
apiVersion: v1
kind: Pod
metadata:
   name: nginx
spec:
   containers:
   - name: nginx
        image: nginx:1.14.2
        addons:
        -- app-a:1.0.1
        -- app-b:2.0.5
        ports:
        - containerPort: 80
```

As shown above, in accordance with one or more aspects of the present invention, an add-on field has been added. In this example, the add-on field specifies add-on app-a (e.g., add-on 530a) and add-on app-b (e.g., add-on 530b). Additional, fewer and/or other add-ons may be specified.

In one or more aspects, an add-ons field is also added to the container runtime interface (e.g., container runtime interface 270). The container runtime interface defines the protocol (e.g., gRPC® (gRemote Procedure Call; gRPC is a registered trademark of The Linux Foundation, San Francisco, CA.) or other protocol) for communication between, e.g., the agent (e.g., agent 260; e.g., kubelet in a Kubernetes architecture) and the container runtime (e.g., container runtime 220). In one aspect, the container runtime interface image message type has been enriched to include an add-ons field, which supports the multi-architecture feature provided by, e.g., an annotations field of the message type. One example of a definition of a container runtime interface image message type is depicted below:

```
message ImageSpec {
   // Container's Image field (e.g., imageID or imageDigest)
   string image=1;
   // Unstructured key-value map holding arbitrary metadata.
   // ImageSpec Annotations can be used to help the runtime
   // target specific images in multi-arch images.
   map<string, string> annotations = 2;
   repeated string add-ons = 3;
}
```

In one or more aspects, enhanced security is provided for an add-on lifecycle, which includes, for instance, distribution, install and run. As examples: Distribution: an add-on may be scanned and certified when distributed via an add-on registry; Install: the root filesystem may be set to read-only after being loaded; Run: an add-on may be run in a sandbox with restricted security context. The user to install and run the add-ons are different, in one example.

In one or more aspects, the image specification is not changed; instead, the container runtime interface specification is changed in order to reduce the image size. The final image data size may be reduced since the configuration is at deployment time. The capability provided herein is generic in that it may be used for many platforms and/or application types, including those that use binary resources and/or dynamic resources.

In one or more aspects, an image size of a container is reduced and stabilized by placing dynamically changing application components as add-ons to the image. Container image contents for a particular user are removed, and provided as one or more add-ons, reducing the size of the core image in the image registry, as well as the size of the container image. This facilitates maintenance of the image registry and provides flexibility in image composition. Add-ons, which may be pre-built, are placed in a central location, such as one or more add-on registries, and are loaded therefrom and placed on top of a core image. That is, a pluggable system is provided that enables add-ons to be dynamically included (e.g., when selected) with a core image and/or removed, at runtime. This reduces the size of the static core image and provides flexibility.

In one or more aspects:

The container image is separated into multiple parts, including a core image (e.g., the data package following, e.g., a selected image format specification loaded from image registries) and image add-ons (components dynamically loaded from add-on registries). The container runtime interface specification, as an example, is enhanced by changing, e.g., the container runtime interface image message type;

The add-on supports multiple media types, including, but not limited to, gzip, zstd, tar, etc.); and The pod specification is enhanced to include an optional add-on field, in addition to the image field.

Although various aspects and/or embodiments are described herein, other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of platforms, protocols, interfaces, add-ons, etc. may use and/or benefit from one or more aspects of the present invention. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
deploying, at runtime, a container image on a node within the computing environment, the deploying comprising downloading, at runtime, container image content from multiple sites, the downloading comprising:
obtaining a core image of the container image from one or more image registries and updating a local image store with the core image; and
obtaining one or more add-ons of the container image from one or more add-on registries and updating a local add-on store with the one or more add-ons, wherein the container image is managed by a container runtime, the container runtime communicating with an agent on the node using a container runtime interface, the container runtime interface including a definition of an image message type that includes an add-on field to specify the one or more add-ons; and
executing the container image on the node.

2. The computer-implemented method of claim 1, wherein the one or more add-ons are chosen from a plurality of add-ons that support a plurality of media types.

3. The computer-implemented method of claim 1, wherein the executing the container image includes using a pod specification that specifies how to execute the container image, the pod specification including an optional add-on field, the optional add-on field to specify the one or more add-ons.

4. The computer-implemented method of claim 1, wherein the one or more add-ons comprise one or more dynamically loaded components from the one or more add-on registries.

5. The computer-implemented method of claim 1, wherein the core image comprises a data package following an image format specification loaded from at least one image registry of the one or more image registries.

6. The computer-implemented method of claim 1, further comprising providing a security context for at least one add-on of the one or more add-ons.

7. The computer-implemented method of claim 6, wherein the security context comprises indicating that the at least one add-on is read-only.

8. The computer-implemented method of claim 1, wherein the deploying the container image comprises deploying the container image wherein a placing of redundant data in a local store is avoided.

9. The computer-implemented method of claim 1, wherein an add-on registry of the one or more add-on registries includes storage for at least one add-on of the one or more add-ons and information relating to the at least one add-on.

10. A computer system for facilitating processing within a computing environment, the computer system comprising:
a memory; and
a node in communication with the memory, wherein the computer system is configured to perform a method, said method comprising:
deploying, at runtime, a container image on the node, the deploying comprising downloading, at runtime, container image content from multiple sites, the downloading comprising:
obtaining a core image of the container image from one or more image registries and updating a local image store with the core image; and
obtaining one or more add-ons of the container image from one or more add-on registries and updating a local add-on store with the one or more add-ons, wherein the container image is managed by a container runtime, the container runtime communicating with an agent on the node using a container runtime interface, the container runtime interface including a definition of an image message type that includes an add-on field to specify the one or more add-ons; and
executing the container image on the node.

11. The computer system of claim 10, wherein the one or more add-ons are chosen from a plurality of add-ons that support a plurality of media types.

12. The computer system of claim 10, further comprising providing a security context for at least one add-on of the one or more add-ons.

13. The computer system of claim 10, wherein the executing the container image includes using a pod specification that specifies how to execute the container image, the pod specification including an optional add-on field, the optional add-on field to specify the one or more add-ons.

14. The computer system of claim 10, wherein an add-on registry of the one or more add-on registries includes storage for at least one add-on of the one or more add-ons and information relating to the at least one add-on.

15. A computer program product for facilitating processing within a computing environment, the computer program product comprising:
one or more computer readable storage media and program instructions collectively stored on the one or more computer readable storage media to perform a method comprising:
deploying, at runtime, a container image on a node within the computing environment, the deploying comprising downloading, at runtime, container image content from multiple sites, the downloading comprising:
obtaining a core image of the container image from one or more image registries and updating a local image store with the core image; and
obtaining one or more add-ons of the container image from one or more add-on registries and updating a local add-on store with the one or more add-ons, wherein the container image is managed by a container runtime, the container runtime communicating with an agent on the node using a container runtime interface, the container runtime interface including a definition of an image message type that includes an add-on field to specify the one or more add-ons; and executing the container image on the node.

16. The computer program product of claim 15, wherein the one or more add-ons are chosen from a plurality of add-ons that support a plurality of media types.

17. The computer program product of claim 15, further comprising providing a security context for at least one add-on of the one or more add-ons.

18. The computer program product of claim 15, wherein the executing the container image includes using a pod specification that specifies how to execute the container image, the pod specification including an optional add-on field, the optional add-on field to specify the one or more add-ons.

19. The computer program product of claim 15, wherein an add-on registry of the one or more add-on registries includes storage for at least one add-on of the one or more add-ons and information relating to the at least one add-on.

20. The computer program product of claim 15, wherein the one or more add-ons comprise one or more dynamically loaded components from the one or more add-on registries.

* * * * *